(12) United States Patent
Marold et al.

(10) Patent No.: US 11,673,106 B2
(45) Date of Patent: Jun. 13, 2023

(54) FIXED BED ARRANGEMENT

(71) Applicant: HITACHI ZOSEN INOVA AG, Zurich (CH)

(72) Inventors: Freimut Marold, Dorsten (DE); Christoph Hütter, Stuttgart (DE); Wolfgang Beez, Tübingen (DE); Adrian Schneider, Dietikon (CH)

(73) Assignee: HITACHI ZOSEN INOVA AG, Zurich (CH)

( * ) Notice: Subject to any disclaimer, the term of this patent is extended or adjusted under 35 U.S.C. 154(b) by 0 days.

(21) Appl. No.: 17/281,737

(22) PCT Filed: Sep. 26, 2019

(86) PCT No.: PCT/EP2019/076063
§ 371 (c)(1),
(2) Date: Mar. 31, 2021

(87) PCT Pub. No.: WO2020/069974
PCT Pub. Date: Apr. 9, 2020

(65) Prior Publication Data
US 2021/0394142 A1    Dec. 23, 2021

(30) Foreign Application Priority Data
Oct. 1, 2018  (DE) .................... 10 2018 007 737.4

(51) Int. Cl.
*B01J 8/00* (2006.01)
*B01J 8/02* (2006.01)
(Continued)

(52) U.S. Cl.
CPC ............. *B01J 8/025* (2013.01); *B01J 8/0285* (2013.01); *B01J 2208/00212* (2013.01); *B01J 2208/00884* (2013.01)

(58) Field of Classification Search
CPC ..... B01J 8/00; B01J 8/02; B01J 8/0242; B01J 8/025; B01J 8/0285; B01J 19/00;
(Continued)

(56) References Cited

U.S. PATENT DOCUMENTS 2,768,882 A    10/1956  Mattson
3,825,501 A *   7/1974  Muenger ................ B01J 8/0285
                                                423/655
(Continued)

FOREIGN PATENT DOCUMENTS

DE     19754185 C1    2/1999
EP      1300190 A1    4/2003
(Continued)

OTHER PUBLICATIONS

English Translation of International Preliminary Report on Patentability dated Mar. 23, 2021, 8 Pages.

*Primary Examiner* — Natasha E Young
(74) *Attorney, Agent, or Firm* — Lucas & Mercanti, LLP; Klaus P. Stoffel (57) ABSTRACT

A fixed bed arrangement formed as an insert for a reactor for catalytic conversion of reaction media, in particular for catalytic methanation of a gas mixture including hydrogen and carbon dioxide, having a receiving chamber, which extends axially within an outer sleeve, and through which reaction media flows during the reactor operation for receiving a catalyst material, and a heat exchanger arrangement having a fluid flow path for a temperature control fluid, which fluid flow path is spatially separated from the receiving chamber, for removing and supplying heat from/to the process. The outer sleeve is formed by the heat exchanger arrangement, at least in regions. The fixed bed arrangement includes a reactor for the catalytic reaction of reaction media having a pressure chamber for receiving reaction media, and (Continued)

such a fixed bed arrangement inserted into the pressure chamber.

21 Claims, 5 Drawing Sheets

(51) Int. Cl.
  *B01J 19/00* (2006.01)
  *B01J 19/24* (2006.01)
(58) Field of Classification Search
  CPC .. B01J 19/24; B01J 19/30–32; B01J 2208/00; B01J 2208/00008; B01J 2208/00017; B01J 2208/00106; B01J 2208/0015; B01J 2208/00132; B01J 2208/00168; B01J 2208/00212; B01J 2208/00796; B01J 2208/00805; B01J 2208/00814; B01J 2208/00884; B01J 2219/00; B01J 2219/00049; B01J 2219/00051; B01J 2219/00074; B01J 2219/00076; B01J 2219/00085; B01J 2219/24; B01J 2219/2401; B01J 2219/245; B01J 2219/2476; B01J 2219/2477; B01J 2219/2481

See application file for complete search history.

(56) References Cited

U.S. PATENT DOCUMENTS

| | | | |
|---|---|---|---|
| 6,926,873 B1 | 8/2005 | Filippi | |
| 7,268,254 B2 | 9/2007 | Olbert | |
| 8,673,230 B2* | 3/2014 | Rizzi | B01J 8/0285 |
| | | | 165/157 |
| 9,170,026 B2* | 10/2015 | Taplan | F24C 15/166 |
| 9,528,772 B2* | 12/2016 | Marold | F28D 9/0031 |
| 2008/0008633 A1 | 1/2008 | Filippi | |

FOREIGN PATENT DOCUMENTS

| | | |
|---|---|---|
| EP | 0995491 B1 | 7/2003 |
| EP | 2514523 A1 | 10/2012 |
| EP | 3124909 A1 | 2/2017 |
| WO | 9501834 A1 | 1/1995 |
| WO | 2012146902 A1 | 11/2012 |
| WO | 2017180957 A1 | 10/2017 |

\* cited by examiner

FIXED BED ARRANGEMENT

CROSS-REFERENCE TO RELATED APPLICATIONS

The present application is a 371 of International application PCT/EP2019/076063, now WO 2020/069974, filed Sep. 26, 2019, which claims priority of DE 10 2018 007 737.4, filed Oct. 1, 2018, the priority of these applications is hereby claimed and these applications are incorporated herein by reference.

BACKGROUND OF THE INVENTION

The invention relates to a fixed bed arrangement in the form of an insert for a reactor for the catalytic conversion of reaction media, in particular for the catalytic methanation of a gas mixture having hydrogen and carbon dioxide, with a receiving chamber, which extends along an axial direction within an outer sleeve, and through which reaction media flow during the reactor operation, for receiving a catalyst material and a heat exchanger arrangement having a fluid flow path for a temperature control fluid, which fluid flow path is spatially separated from the receiving chamber, for removing and supplying heat to/into the process as well as a reactor for the catalytic conversion of reaction media, in particular for the catalytic methanation of a gas mixture having hydrogen and carbon dioxide, with a pressure chamber for receiving reaction media, and such a fixed bed arrangement inserted into the pressure chamber.

A fixed bed arrangement having the above-mentioned features is known from prior art, for example from DE 197 54 185 C1, and is used, for example in reactor systems with which a methanation method can be performed. In such a process, a reaction medium in the form of an educt gas which contains hydrogen and carbon dioxide in a stoichiometric ratio substantially suitable for the methane production, and in addition, if applicable, can also have fractions of carbon monoxide, methane other hydrocarbons as well as impurities in the form of diverse minor components and insert gases (for example $N_2$), is inserted into a pressure vessel of the reactor at a predetermined temperature and a predetermined pressure. An insert with a fixed bed arrangement (fixed bed catalyst), which is arranged in a receiving chamber, is provided in the pressure chamber, which fixed bed arrangement supports the following processes forming in the sum $CH_4$:

1. $CO+H_2O \leftrightarrow CO_2+H_2$, the so-called water-gas shift reaction

2. $CO+3H_2 \leftrightarrow CH_4+4H_2O$, the CO-methanation and

3. $CO_2+4H_2 \leftrightarrow CH_4+2H_2O$, the $CO_2$-methanation

Thus, the catalyst material, such as ruthenium, platinum or nickel, is flowed through by the reaction medium.

As the reaction takes place in the receiving chamber, a significant part of the reaction heat is to be removed. For this purpose, the fixed bed arrangement has a heat exchanger arrangement. A fluid flow path which is configured for receiving a suitable temperature control fluid is provided therein. Thus, the guidance of the temperature control fluid and the guidance of the reaction medium can be carried out, for example, in the counter-current method.

However, in connection with the fixed bed arrangement disclosed in DE 197 54 185 C1, the heat exchanger arrangement and thus the fixed bed arrangement are to be adapted to the inner wall of the pressure vessel of the reactor. Still, such an adaption is complicated in terms of manufacturing technology in the case of a pressure vessel, which usually has a cylindrical shape at these pressures, and is therefore expensive.

In order to simplify the system of fixed bed arrangement and pressure vessel of the reactor, a reactor with a heat exchanger arrangement consisting of a plate package with an enclosure is disclosed in EP 0 995 491 B1, in which the enclosed plate package is inserted on the circumferential side (regarding the flow direction) into the pressure vessel without adaption. As a result, the installation of the heat exchanger arrangement is simplified independently of the shape of the pressure vessel.

A further improvement is thus achieved by the fixed bed arrangement disclosed in EP 0 995 491 B1 compared to the reactor disclosed in DE 197 54 185 C1.

SUMMARY OF THE INVENTION

It is an object of the present invention to achieve a still further improvement of conventional fixed bed arrangements and conventional reactors with a fixed bed arrangement, in particular with regard to their structural design.

This object is achieved by a further development of the fixed bed arrangement which was mentioned at the beginning, and which is essentially characterized in that the outer sleeve is formed, at least in regions, by the heat exchanger arrangement.

The invention is based on the finding that, as a result of the design according to the invention of at least one region of the outer sleeve by the heat exchanger arrangement itself, a considerable structural simplification can be achieved since the otherwise customary enclosure of the fixed bed arrangement, which enclosure is disclosed, for example, in EP 0 995 491 B1, is dispensed with at least in regions. Then, the heat exchanger arrangement takes over, at least in regions, the function of the support of the catalyst material. Thus, the outer shell can also be formed predominantly or even completely by the heat exchanger arrangement.

The insert can be designed in the form of a hanging insert. In this way, by hanging into a reactor, the fixed bed arrangement can easily be connected thereto. Additionally, such an embodiment also enables a particularly easy replacement of the fixed bed arrangement, for example for maintenance and/or repair purposes. In this connection, the hanging insert can be designed in such a way that it fits to the reactor cross-sectional form and may have a support ring.

In a preferred embodiment of the fixed bed arrangement, a connection line to the fluid flow path can be formed in a flexible manner at least at an axial end, especially at a hanging end. Thereby, a thermal longitudinal expansion of the heat exchanger arrangement during operation of the reactor can be compensated since the connection line is capable of moving along with a longitudinal expansion of the reactor arrangement. In this way, problems due to material expansion in case of a temperature increase are avoided.

In an embodiment of the invention, an axial end of the insert can be limited by a sieve. The sieve can be arranged at a lower end of the insert in the direction of gravity. The fixed bed catalyst can then be deposited onto the sieve and be carried by it. In this connection, the sieve is preferably movable relative to the insert. Particularly preferably, the sieve can be displaceable, for example extendable, in a direction running transversely to the direction of gravity. This makes it possible to replace the catalyst material in a particularly easy manner.

In an advantageous embodiment of the invention, the heat exchanger arrangement has at least one first heat exchanger plate, in particular made of thermal plate. Thus, the thermal plate can form a region on the outer sleeve of the heat exchanger arrangement. Thermal plates are known as such from prior art and have at least two sheet plates, preferably made of stainless steel, which are welded together at predetermined points and are shaped, with cushion formation, in such a way that, for example, elliptical flow channels arise which, owing to the cushion-like design, increase the turbulence of the flow and thus can lead to particularly favourable heat transfer conditions. Hence, the temperature control fluid can be guided through the flow channels. Thermal plates are self-supporting and enable the construction of a compact heat exchanger having a large heating surface density without flow-dead zones. For example, the heat exchanger arrangement may have a plate package of thermal plates.

Preferably, the heat exchanger arrangement has at least one second heat exchanger plate arranged substantially parallel to the first heat exchanger plate, wherein the first and the second heat exchanger plates each form at least one region of the outer sleeve. The second heat exchanger plate can be designed as a thermal plate. As a result of the parallel arrangement of the two heat exchanger plates, an essentially box-shaped structure of the insert is achieved. In a further embodiment, further heat exchanger plates arranged substantially parallel to the first and to the second heat exchanger plates can be arranged between the first and the second heat exchanger plates and form a plate package. All heat exchanger plates can be configured as a thermal plate. The heat exchanger plates are spaced apart from each other and thus form the receiving chamber for receiving a catalyst material. Then, the catalyst material can be deposited between the heat exchanger plates.

The first and the second heat exchanger plates can be connected to one another in a medium-tight manner, in particular by a U-profile. Thus, the first and the second heat exchanger plates can be welded together. This results in an insert having a substantially cuboid construction, in which two opposite sides of the cuboid are formed by the heat exchanger plates, two further sides of the cuboid are formed by the U-profile and two further, opposite sides of the cuboid are open. Preferably, the two open sides form the upper and the lower end of the insert, wherein the lower end may be limited by a sieve. It is thus possible to produce heat exchanger arrangements of any dimensions in a particularly simple manner corresponding to the size of a pressure vessel of a reactor.

Further, the invention relates to a reactor for the catalytic conversion of reaction media, in particular for the catalytic methanation of a gas mixture having hydrogen and carbon dioxide, with a pressure chamber for receiving reaction media and a fixed bed arrangement inserted into the pressure chamber and having the above-mentioned features. In this connection, the fixed bed arrangement can be insertable into the pressure chamber and detachable from the pressure chamber. Preferably, for this purpose, the reactor has a device for hanging in the fixed bed arrangement, in particular via a support ring. This enables a particularly simple exchange of the fixed bed arrangement.

In a preferred embodiment of the reactor, a medium flow path along which a reaction medium flows during reactor operation has a first section running through the receiving chamber of the fixed bed arrangement and a second section running between the outer sleeve of the fixed bed arrangement and a wall of the pressure chamber. In such a configuration, an educt gas can be introduced from a feed line into the pressure vessel, where it then flows through the fixed bed catalyst arranged in the receiving chamber of the insert. After flowing through the catalyst, the reaction medium emerges as product gas from the receiving chamber of the fixed bed arrangement. The product gas is correspondingly tempered, for example cooled, by the temperature control medium flowing in the heat exchanger arrangement. However, the temperature control can also be a heating. Thereafter, the product gas is guided through a second section between the outer sleeve of the fixed bed arrangement and a wall of the pressure chamber. Thus, since the outer sleeve of the fixed bed arrangement is formed, at least in regions, by the heat exchanger arrangement, a further temperature control, for example cooling, of the product gas can be achieved. Due to this further temperature control step, the reactor jacket does not have to be designed for the temperature of the reaction. Hence, the temperature load of the wall of the pressure chamber is limited to the temperature of the temperature control medium, whereby the requirements to the selection for the construction material of the pressure chamber are reduced.

In an embodiment of the reactor, a ratio V from a surface area $F_E$ of a cut surface of the insert running perpendicular to the axial direction (A) and a surface area $F_D$ of a cut surface of the pressure chamber running perpendicular to the axial direction (A), $V=F_E/F_D$, can satisfy the condition $V<2/\pi$, preferably $V<0.5$, particularly preferably $V<0.4$ and even more preferably $V<0.3$.

Moreover, along an outer side of the wall, the pressure chamber of the reactor can be provided with an insulating material. In this way, a thermal radiation of the reactor can be reduced.

BRIEF DESCRIPTION OF THE DRAWING

In the following, the invention will be described by way of example with reference to the accompanying drawings. In the drawings.

DETAILED DESCRIPTION OF THE INVENTION

Figure 1:
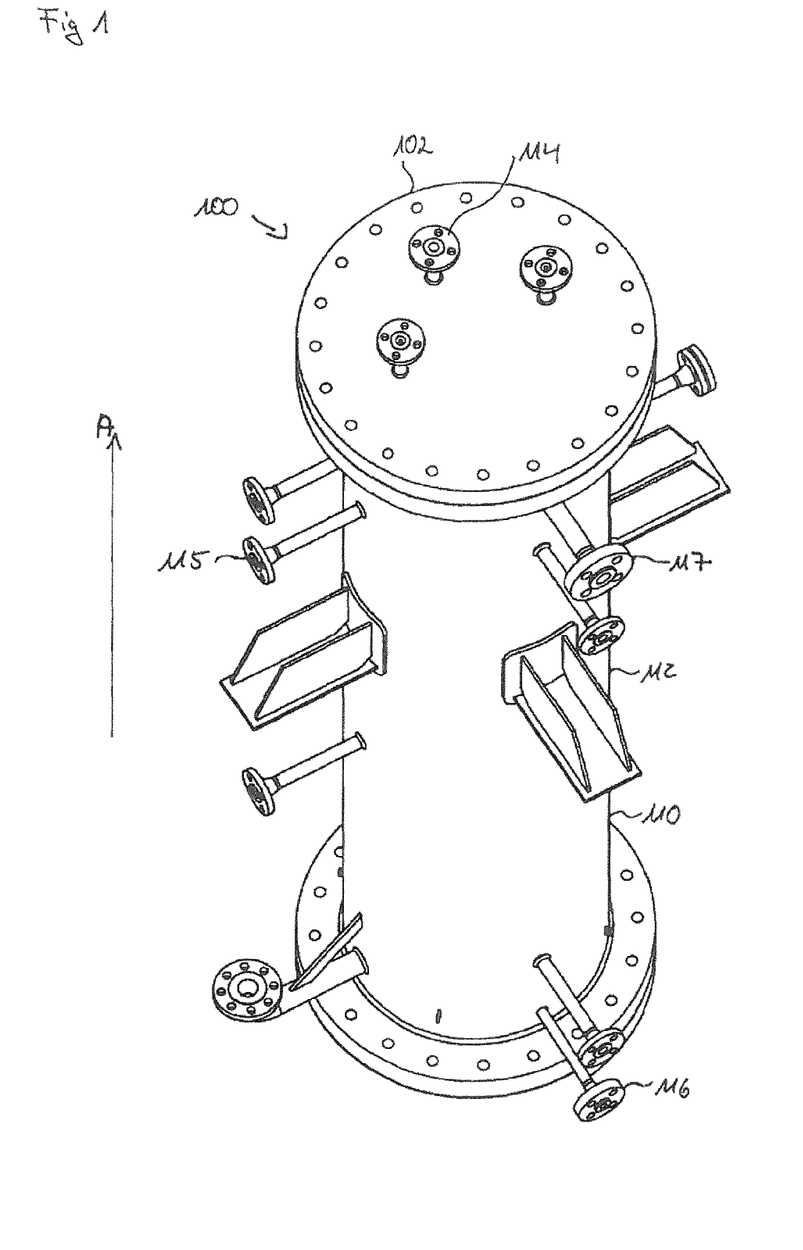
FIG. 1 shows a perspective view of a pressure vessel of a reactor according to the invention.

FIG. 1 shows a perspective view of a pressure chamber 110 of a reactor 100. The pressure chamber 110 is limited by a cylinder-shaped wall 112. Thus, the axis of the cylinder defines an axial direction A running in parallel with the direction of gravity. The pressure chamber 110 is closed by a detachable lid 102 at a first end (upper end). By detaching the lid 102, access to the interior of the pressure chamber 110 is achieved. Hence, the fixed bed arrangement is insertable into the pressure chamber 110 and detachable therefrom.

Furthermore, the pressure chamber 110 of the reactor has different accesses. An educt gas which, for example, contains hydrogen and carbon dioxide in stoichiometric ratios substantially suitable for the methane production, can be introduced into the pressure chamber 110 through an educt gas inlet 114. After the educt gas has flowed through the later described fixed bed arrangement and is methanized there, a resulting product gas can stream out of the pressure chamber through the product gas outlet 115. In order to remove the reaction heat produced during the reaction taking place, a temperature control fluid, for example water, can be introduced into the interior of the pressure chamber 110 through a temperature control fluid inlet 116. After the temperature control fluid has received the produced heat, it can then stream out of the pressure chamber 110 through a temperature control fluid outlet 117.

Figure 2A:
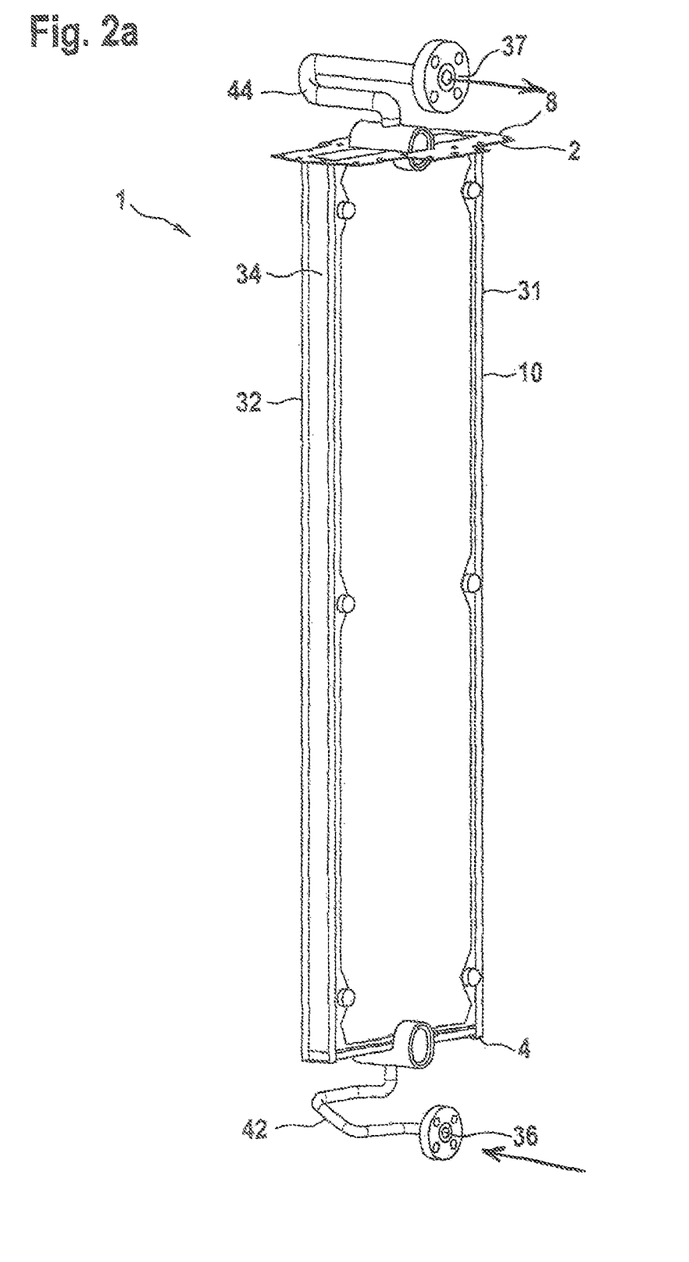
FIG. 2a shows a perspective view of a fixed bed arrangement according to the invention in the form of an insert for the pressure vessel which is shown in FIG. 1.

FIG. 2a shows a fixed bed arrangement according to the invention in the form of an insert 1 for the insertion into the pressure chamber 110 shown in FIG. 1. The insert 1 has an outer sleeve 10. In the exemplary embodiment shown in FIG. 2, the outer sleeve 10 is formed by a first heat exchanger plate 31, a second heat exchanger plate 32, which is arranged approximately parallel to the first heat exchanger plate 31 and spaced apart therefrom, and two U-profiles 34 connecting the first heat exchanger plate 31 to the second heat exchanger plate 32. A receiving chamber 20 shown in FIG. 3 for receiving a catalyst material is limited thereby. At a first axial end 4 (lower end), the receiving chamber 20 may be limited by a sieve. At a second axial end 8 (upper end) opposite the first axial end 4, the insert 1 has a first support ring 2 with which the insert 1, as will be described later, can be hanged into the pressure chamber 110.

At the first axial end 4, the insert 1 has a temperature control fluid inlet 36. The temperature control fluid inlet 36 is being connected to the temperature control fluid inlet 116 of the pressure chamber 110, so that a temperature control fluid from the outside via the temperature control fluid inlet 36 and a connection line 42 can be introduced into the receiving chamber 20 of the insert 1 (see FIG. 2b). In an example according to the invention, the connection line 42 is formed in a flexible manner at the first axial end 4. Thereby, the thermal expansion of the heat exchanger arrangement can be compensated during operation of the reactor. Also, at the second axial end 8, the insert has a connection line 44 which is connected to a temperature control fluid outlet 37. The temperature control fluid outlet 37 can be connected to a temperature control fluid outlet 117 of the pressure chamber 110 (see FIG. 2b). As a result, the temperature control fluid, after it has received the heat produced during the reaction, can be conducted out of the receiving chamber 20 of the insert 1 and out of the pressure chamber 110 of the reactor to the outside.

Figure 2B:
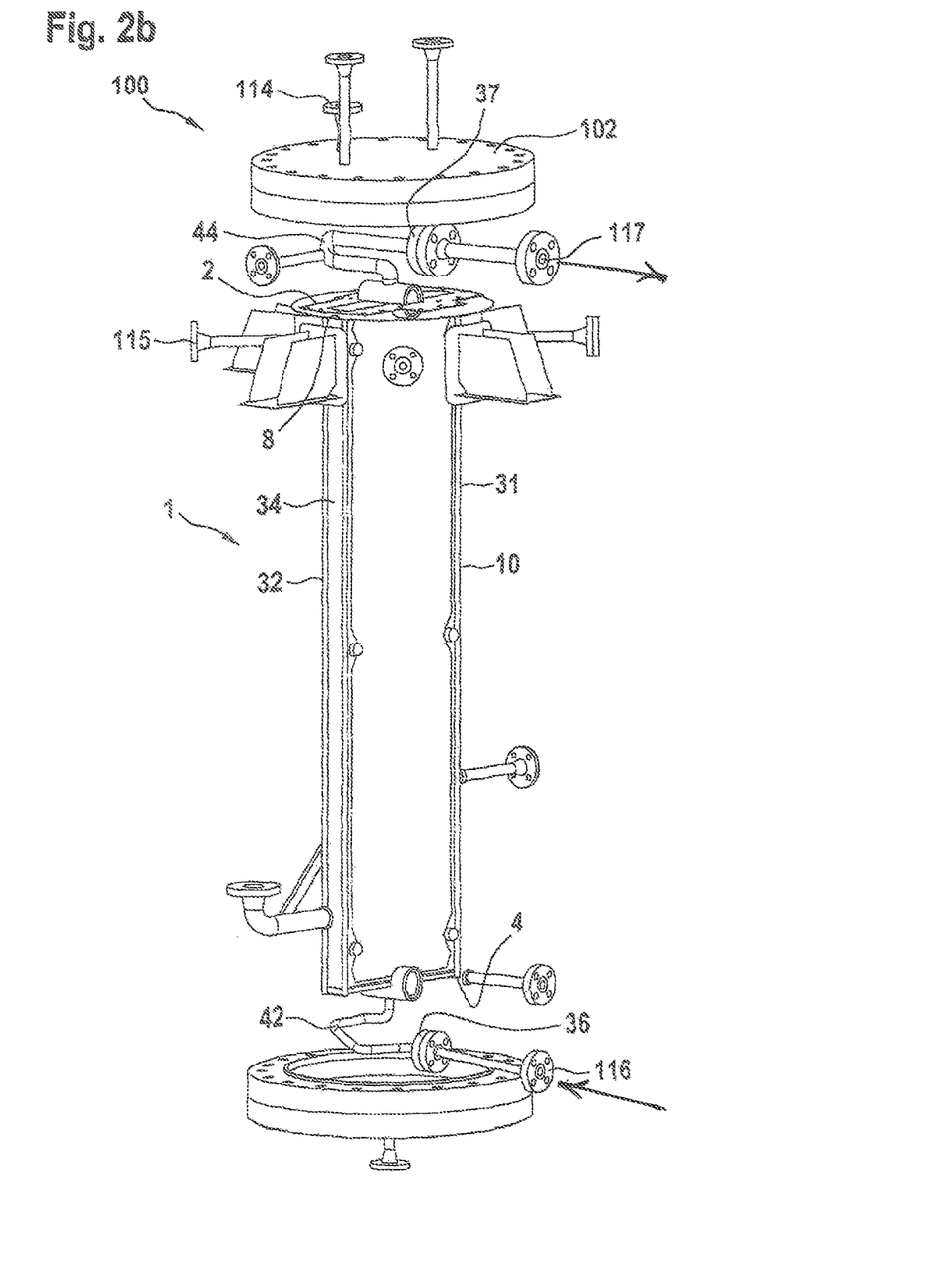
FIG. 2b shows a perspective view of the insert, which is inserted into the pressure vessel of FIG. 1, according to FIG. 2b without the cylinder-shaped wall of the pressure vessel.

FIG. 2b shows the insert 1 shown in FIG. 2a in its state inserted into the pressure chamber 110 of the reactor 100. The cylindrical wall 112 (see FIG. 1) of the pressure chamber 110 is not shown in the figure.

Figure 3:
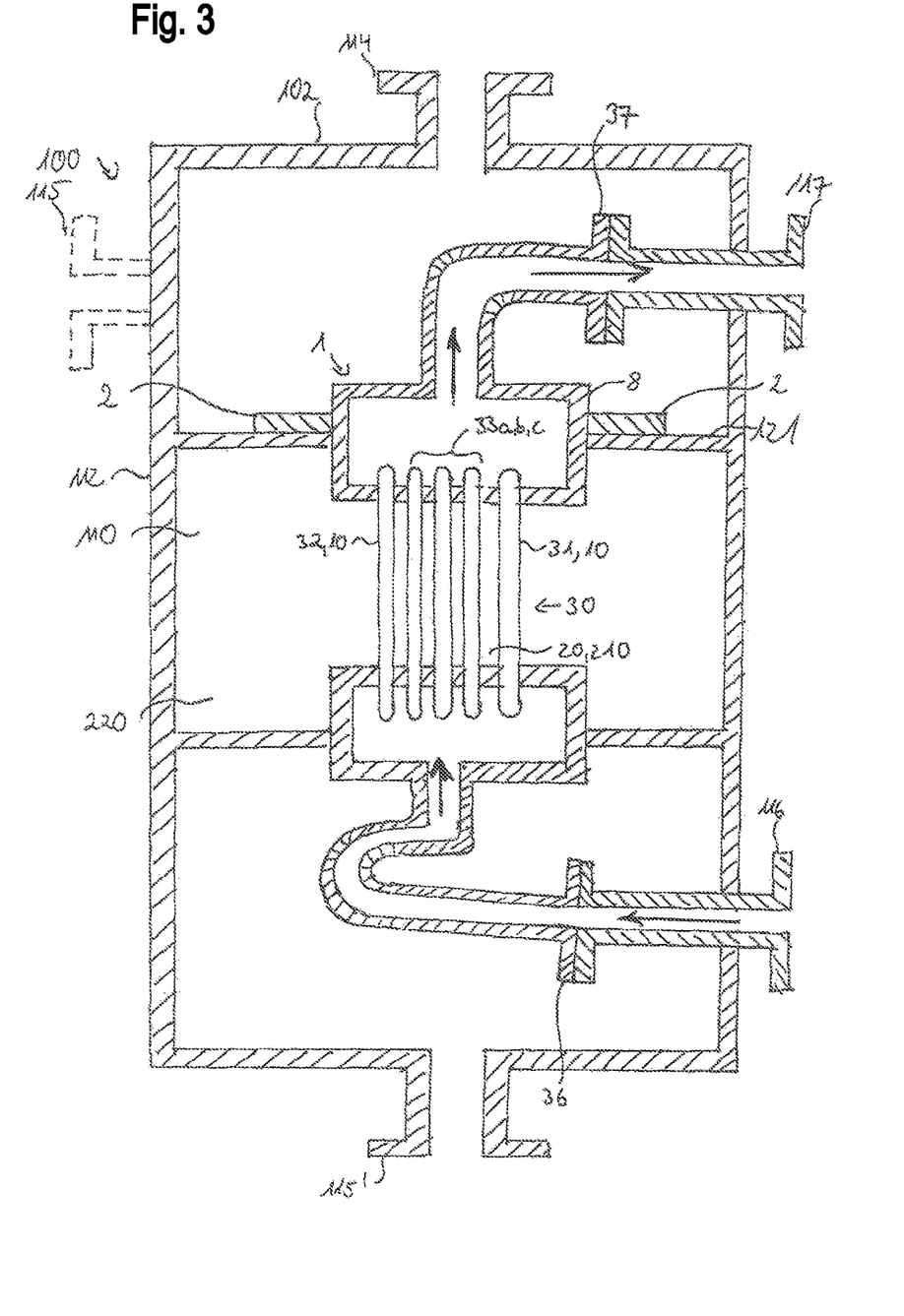
FIG. 3 shows a schematic sectional view of the pressure vessel and the insert inserted therein.

FIG. 3 schematically shows a cross section through the above-explained pressure chamber 110 into which the fixed bed arrangement according to the invention has been inserted in the form of the insert 1. The pressure chamber 110 is limited by the wall 112 and has, at its upper end, the detachable lid 102. The insert 1 has also the heat exchanger arrangement in the form of heat exchanger plates 31, 32, 33a, 33b, 33c. A first heat exchanger plate 31 and a second heat exchanger plate 32 which is arranged parallel to the first heat exchanger plate 31 and spaced apart therefrom form a region of the outer sleeve 10 of the receiving chamber 20. In the shown example, three further heat exchanger plates 33a, 33b, 33c are arranged between the first heat exchanger plate 31 and the second heat exchanger plate 32. However, the fixed bed arrangement according to the invention is not limited to this embodiment, but any suitable number of heat exchanger plates can be arranged between the first heat exchanger plate 31 and the second heat exchanger plate 32.

During operation of the reactor 100, a temperature control fluid for supplying and removing heat can be conducted through the temperature control fluid inlet 36 of the insert 1 to the heat exchanger arrangement 30 with the heat exchanger plates 31, 32, 33a, 33b, 33c, said temperature control fluid inlet being connected to the temperature control fluid inlet 116 of the pressure chamber 110. The temperature control fluid flows through the heat exchanger plates 31, 32, 33a, 33b, 33c starting from the side of the temperature control fluid inlet 36 to the side of the temperature control fluid outlet 37 of the insert 1. The temperature control fluid can leave the reactor 100 via the temperature control fluid outlet 117 of the pressure chamber 110, said temperature control fluid outlet being connected to the temperature control fluid outlet 37. The first heat exchanger plate 31 and the second heat exchanger plate 32 are connected to one another at their side ends by U-profiles 34 which are not shown (see FIG. 4b).

In the region of the first axial end 4 (lower end) of the insert 1, the insert 1 is limited by a sieve, which cannot be seen in the representation of FIG. 3. The catalyst material can be deposited between the heat exchanger plates 31, 32, 33a, 33b, 33c onto the sieve supporting the catalyst material.

At a second axial end 8 (upper end), the insert 1 has a first support ring 2. The first support ring 2 is designed complementary to a second support ring 121 of the pressure chamber 110. The insert 1 can thus be hanged into the pressure chamber 110 and is therefore designed as a hanging insert.

During operation of the reactor 100, a reaction medium, for example an educt gas, which is supplied via an educt gas inlet 114, can now flow through the catalyst material which is arranged within the receiving chamber 20. The heat required or to be removed during the reaction can be supplied or removed by interaction with the temperature control fluid flowing through the heat exchanger arrangement 30. The resulting product gas can then leave the reactor 100 in an embodiment through a product gas outlet 115'.

In another embodiment of the invention, the reaction medium, for example the educt gas, flows, at first, through a first section 210 within the receiving chamber 20 (i.e., through the receiving chamber 20 limited by the first heat exchanger plate 31, the second heat exchanger plate 32 and the U-profiles), and is then guided as a product gas along a second section 220, which runs between the outer sleeve 10 of the fixed bed arrangement and the wall 112 of the pressure chamber 110, to the product gas outlet 115 provided instead of the product gas outlet 115' (see FIG. 1) (shown in FIG. 3 with a dashed line), and then leaves the pressure chamber 110. This means that the product gas outlet 115' is not present in this embodiment, and instead, the product gas outlet 115 is provided in the wall 112 of the pressure chamber 110. Owing to the fact that the outer sleeve 10 in the region of the second section 220 is, at least in regions, limited by the first heat exchanger plate 31 and the second heat exchanger plate 32, the resulting product gas is able to exchange additional heat via the heat exchanger plates 31, 32 of the heat exchanger arrangement 30. Thereby, a particularly good temperature control of the product gas can be obtained.

Figure 4A:
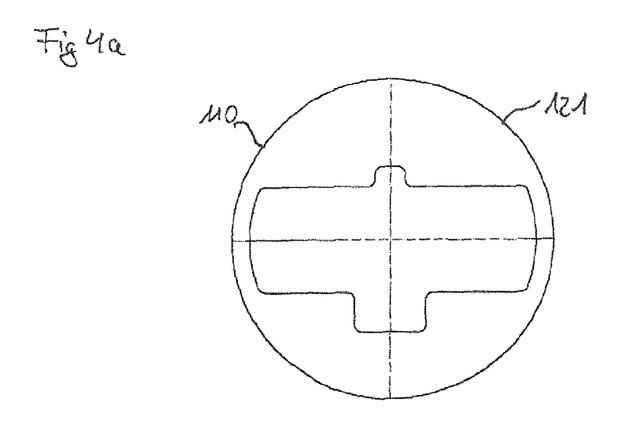
FIG. 4a shows a plan view of the pressure chamber with a support ring.
Figure 4B:
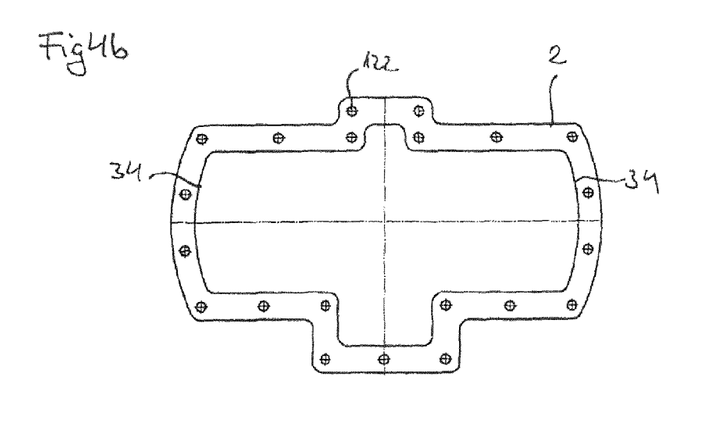
FIG. 4b shows a plan view of a hanging insert

FIGS. 4a and 4b show a plan view of a hanging insert with a first support ring 2 (FIG. 4b) as well as of a second support ring 121 (FIG. 4a). FIG. 4a shows the second support ring 121 which is designed at the pressure chamber 110. Therein a recess is provided in the form of the insert 1 of the fixed bed arrangement for enabling an insertion of the insert 1. As can be seen from FIG. 4b, the insert 1 has a first support ring 2 which is designed in a complementary manner relative to the second support ring 121. This allows for obtaining a medium-tight connection between the insert 1 and the pressure chamber 110. The first support ring 2 can be screwed to the second support ring 121 by means of fastening means, such as screws 122.

The invention claimed is:

1. A fixed bed arrangement formed as an insert for a reactor for catalytic conversion of reaction media, comprising: an outer sleeve; a receiving chamber that extends in an axial direction within the outer sleeve, and through which the reaction media flow during reactor operation, for receiving a catalyst material, the outer sleeve being arranged between a first and a second axial end and, regarding a circumferential side, surrounding the receiving chamber; and a heat exchanger arrangement having a fluid flow path for a temperature control fluid for removing and supplying heat, the fluid flow path being spatially separated from the receiving chamber, wherein the outer sleeve is at least partly formed by the heat exchanger arrangement by comprising a first and a second heat exchanger plate connected to one another by U-profiles, while the outer sleeve is open at its axial ends.

2. The fixed bed arrangement according to claim 1, wherein the insert is a hanging insert.

3. The fixed bed arrangement according to claim 2, further comprising a flexible connection line to the fluid flow path at least at an axial end of the insert.

4. The fixed bed arrangement according to claim 3, wherein the flexible connection line is at a hanging end of the insert.

5. The fixed bed arrangement according to claim 1, further comprising a sieve arranged so as to limit a first axial end of the insert.

6. The fixed bed arrangement according to claim 5, wherein the sieve is movable relative to the insert.

7. The fixed bed arrangement according to claim 1, wherein the heat exchanger arrangement includes at least one first heat exchanger plate.

8. The fixed bed arrangement according to claim 7, wherein the at least one first heat danger plate is made of thermal plate.

9. The fixed bed arrangement according to claim 7, wherein the heat exchanger arrangement includes at least one second heat exchanger plate, wherein the first and the second heat exchanger plates each form at least one region of the outer sleeve.

10. The fixed bed arrangement according to claim 9, wherein the at least one second heat exchanger plate which is arranged parallel to the at least one first heat exchanger plate.

11. The fixed bed arrangement according to claim 9, wherein the first and the second heat exchanger plates are connected to one another in a medium-tight manner.

12. The fixed bed arrangement according to claim 11, wherein the first and the second heat exchanger plates are connected by a U-profile.

13. A reactor for the catalytic conversion of reaction media, comprising: a pressure chamber for receiving reaction media; and a fixed bed arrangement according to claim 1 that is inserted into the pressure chamber.

14. The reactor according to claim 13, further comprising a device for hanging in the fixed bed arrangement.

15. The reactor according to claim 14, wherein the device for hanging the fixed bed arrangement includes a support ring.

16. The reactor according to claim 13, including a medium flow path, along which a reaction medium flows during reactor operation, that has a first section running through the receiving chamber of the fixed bed arrangement and a second section running between the outer sleeve of the fixed bed arrangement and a wall of the pressure chamber.

17. The reactor according to claim 13, wherein a ratio from a surface area $F_E$ of a cut surface of the insert running perpendicular to the axial direction and a surface area $F_D$ of a cut surface of the pressure chamber running perpendicular to the axial direction, $V=F_E/F_D$, satisfies the condition $V<2/\pi$.

18. The reactor according to claim 17, wherein the ratio satisfies the condition $V<0.5$.

19. The reactor according to claim 18, wherein the ratio satisfies the condition $V<0.4$.

20. The reactor according to claim 19, wherein the ratio satisfies the condition $V<0.3$.

21. The reactor according to claim 13, wherein the reactor is configured for catalytic methanation of a gas mixture having hydrogen and carbon dioxide.

* * * * *